United States Patent

Danning

(10) Patent No.: US 9,316,417 B2
(45) Date of Patent: Apr. 19, 2016

(54) FRAMING SYSTEM FOR MOUNTING SOLAR COLLECTING DEVICES

(75) Inventor: Matthew G. Danning, Oakland, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 186 days.

(21) Appl. No.: 13/539,169

(22) Filed: Jun. 29, 2012

(65) Prior Publication Data

US 2014/0001129 A1    Jan. 2, 2014

(51) Int. Cl.
*F24J 2/52*    (2006.01)
*H02S 20/24*    (2014.01)

(52) U.S. Cl.
CPC .............. *F24J 2/5262* (2013.01); *H02S 20/24* (2014.12); *F24J 2/5211* (2013.01); *Y02B 10/20* (2013.01); *Y02E 10/47* (2013.01)

(58) Field of Classification Search
CPC ....... F24J 2/5205; F24J 2/5209; F24J 2/5211; F24J 2/5262; H02S 20/24
USPC ......... 211/41.1; 136/251; 248/237; 52/173.3; 126/569, 623
See application file for complete search history.

(56) References Cited

U.S. PATENT DOCUMENTS

| | | | |
|---|---|---|---|
| 4,269,173 A * | 5/1981 | Krueger et al. | 126/634 |
| 4,611,090 A * | 9/1986 | Catella et al. | 136/251 |
| 5,125,608 A * | 6/1992 | McMaster et al. | 248/163.1 |
| 7,012,188 B2 * | 3/2006 | Erling | 136/251 |
| 8,104,239 B2 * | 1/2012 | Fath | 52/173.3 |
| 8,266,846 B2 * | 9/2012 | Schoell | 52/173.3 |
| 8,276,330 B2 * | 10/2012 | Harberts et al. | 52/173.3 |
| 8,365,479 B2 * | 2/2013 | Tucker | 52/173.3 |
| 8,402,703 B2 * | 3/2013 | Brandt et al. | 52/173.3 |
| 8,404,968 B2 * | 3/2013 | Kanbara et al. | 136/251 |
| 8,407,961 B2 * | 4/2013 | Kemple et al. | 52/506.03 |
| 8,413,946 B2 * | 4/2013 | Hartelius et al. | 248/500 |
| 8,418,983 B2 * | 4/2013 | Hartelius et al. | 248/500 |
| 8,418,984 B2 * | 4/2013 | Hartelius et al. | 248/500 |
| 8,572,909 B2 * | 11/2013 | Rivera et al. | 52/173.3 |
| 8,615,939 B2 * | 12/2013 | Seery et al. | 52/173.3 |
| 8,661,747 B2 * | 3/2014 | Eide | 52/173.3 |
| 8,671,631 B2 * | 3/2014 | Schroeder et al. | 52/173.3 |
| 8,677,701 B2 * | 3/2014 | Kruse | 52/173.3 |

(Continued)

FOREIGN PATENT DOCUMENTS

EP    0 188 096 B1    8/1990
EP    1 870 645 A2    12/2007

(Continued)

OTHER PUBLICATIONS

International Preliminary Report on Patentability issued Dec. 31, 2014, International Application No. PCT/US2013/046980, International filing date Jun. 21, 2014, 9 pages.

*Primary Examiner* — Stanton L Krycinski
(74) *Attorney, Agent, or Firm* — Knobbe, Martens, Olson & Bear LLP

(57) ABSTRACT

A framing system for mounting solar collection devices to form a solar array can include a plurality of interconnected frame members having connectors provided on the frame members to form rows of an array solar collector devices. Mounts can be provided at the upper portion of the frame members to secure the solar collecting devices at a raised position. The framing system can simplify the installation of the wiring system before the solar collection devices are attached to the frame members.

22 Claims, 5 Drawing Sheets

(56) References Cited

U.S. PATENT DOCUMENTS

| | | | |
|---|---|---|---|
| 8,684,190 B2 * | 4/2014 | Abar | 211/41.1 |
| 8,763,346 B2 * | 7/2014 | Kuster et al. | 52/747.1 |
| 2003/0101662 A1 * | 6/2003 | Ullman | 52/27 |
| 2005/0166955 A1 * | 8/2005 | Nath et al. | 136/251 |
| 2006/0090789 A1 * | 5/2006 | Thompson | 136/246 |
| 2008/0236571 A1 * | 10/2008 | Keshner et al. | 126/623 |
| 2008/0251115 A1 * | 10/2008 | Thompson et al. | 136/251 |
| 2009/0032089 A1 * | 2/2009 | Chen et al. | 136/251 |
| 2009/0151775 A1 * | 6/2009 | Pietrzak | 136/251 |
| 2009/0230265 A1 * | 9/2009 | Newman et al. | 248/229.11 |
| 2009/0308434 A1 * | 12/2009 | Franceschini | 136/251 |
| 2010/0132769 A1 * | 6/2010 | Potter et al. | 136/251 |
| 2010/0237028 A1 * | 9/2010 | Cusson | 211/41.1 |
| 2010/0237029 A1 * | 9/2010 | Cusson et al. | 211/41.1 |
| 2010/0269888 A1 * | 10/2010 | Johnston, Jr. | 136/251 |
| 2010/0275975 A1 * | 11/2010 | Monschke et al. | 136/251 |
| 2011/0024582 A1 * | 2/2011 | Gies et al. | 248/122.1 |
| 2011/0068244 A1 * | 3/2011 | Hartelius et al. | 248/298.1 |
| 2011/0072631 A1 * | 3/2011 | Hartelius et al. | 29/428 |
| 2011/0094559 A1 * | 4/2011 | Potter et al. | 136/244 |
| 2011/0094569 A1 * | 4/2011 | Hartley et al. | 136/251 |
| 2011/0220596 A1 * | 9/2011 | Cusson et al. | 211/41.1 |
| 2011/0233157 A1 * | 9/2011 | Kmita | 211/41.1 |
| 2011/0272367 A1 * | 11/2011 | Kufner | 211/41.1 |
| 2011/0272368 A1 * | 11/2011 | Kufner | 211/41.1 |
| 2011/0290306 A1 * | 12/2011 | Roberts | 136/251 |
| 2012/0017526 A1 * | 1/2012 | Eide | 52/173.3 |
| 2012/0036717 A1 * | 2/2012 | Belikoff et al. | 29/890.033 |
| 2012/0048351 A1 * | 3/2012 | Rizzo | 136/251 |
| 2012/0061337 A1 * | 3/2012 | Seery et al. | 211/41.1 |
| 2012/0085395 A1 * | 4/2012 | Kuster et al. | 136/251 |
| 2012/0090665 A1 * | 4/2012 | Zuritis | 136/251 |
| 2012/0091077 A1 * | 4/2012 | Zuritis | 211/41.1 |
| 2012/0103391 A1 * | 5/2012 | Tucker | 136/245 |
| 2012/0124922 A1 * | 5/2012 | Cusson et al. | 52/173.3 |
| 2012/0132262 A1 * | 5/2012 | Sagayama | 136/251 |
| 2012/0145228 A1 * | 6/2012 | Miros et al. | 136/251 |
| 2012/0145848 A1 * | 6/2012 | Schuff et al. | 248/219.2 |
| 2012/0152333 A1 * | 6/2012 | Mittan et al. | 136/251 |
| 2012/0174968 A1 * | 7/2012 | Karg et al. | 136/251 |
| 2012/0175322 A1 * | 7/2012 | Park et al. | 211/41.1 |
| 2012/0175486 A1 * | 7/2012 | Gotter | 248/398 |
| 2012/0217209 A1 * | 8/2012 | Marcotte et al. | 211/41.1 |
| 2012/0223033 A1 * | 9/2012 | Molek | 211/41.1 |
| 2012/0234377 A1 * | 9/2012 | Erickson | 136/251 |
| 2012/0235017 A1 * | 9/2012 | Scanlon et al. | 250/203.4 |
| 2012/0273031 A1 * | 11/2012 | Sagayama | 136/251 |
| 2012/0285515 A1 * | 11/2012 | Sagayama | 136/251 |
| 2013/0032200 A1 * | 2/2013 | Schnitzer et al. | 136/251 |
| 2013/0092215 A1 * | 4/2013 | Schroeder et al. | 136/251 |
| 2013/0125959 A1 * | 5/2013 | Sagayama et al. | 136/251 |
| 2013/0139869 A1 * | 6/2013 | Nuernberger et al. | 136/251 |
| 2013/0139870 A1 * | 6/2013 | Nuernberger et al. | 136/251 |
| 2013/0141845 A1 * | 6/2013 | Nuernberger et al. | 361/679.01 |
| 2013/0167907 A1 * | 7/2013 | Bitarchas et al. | 136/251 |

FOREIGN PATENT DOCUMENTS

| | | |
|---|---|---|
| JP | 02591141 Y2 | 12/1998 |
| JP | 2010-141266 A | 6/2010 |
| KR | 10-0946308 B1 | 2/2008 |

* cited by examiner

FRAMING SYSTEM FOR MOUNTING SOLAR COLLECTING DEVICES

BACKGROUND OF THE INVENTIONS

1. Field of the Inventions

The present inventions relate to mounting systems for mounting solar energy collection devices, such as for example, modular framing systems for mounting solar photovoltaic (PV) modules to fixed or moving structures.

2. Description of the Related Art

Some known mounting systems for mounting photovoltaic modules to fixed structures include the use of long rails that are arranged in parallel and fixed to a structure to form one or more rows. Photovoltaic modules which include integral frames, are then fixed to the rails.

Other known systems are designed specifically for PV modules that have integrated frames that are sufficiently strong to provide some structural support to adjacent or surrounding modules in the final installation configuration. In this type of mounting system, roof anchors are connected to the frames of some of the modules, so as to directly connect to and support those modules above a fixed structure, such as a roof of a building. Other devices are used to directly connect the frames of the modules to each other.

Some of the modules are not directly supported by the fixed structure. Instead, some of the modules are suspended above the fixed structure by way of their connection to the frames of adjacent modules. Thus, the frames of some of the modules are subject to the loads created by their own weight and aerodynamics as well as the weight and aerodynamics of the adjacent module. In order to simplify the construction, these modules are typically constructed with identical frames with uniform cross sections. Thus, the frames often have redundant, unnecessary material.

Furthermore, when installing such systems, the wiring is completed after the solar laminates have been secured to the modules. Some of the installation process must be performed by accessing the space under the array, which can be laborious and tedious. Another drawback of some of the existing framings systems is that part some of the solar energy directly impacts the frames of the modules.

SUMMARY

Some of the inventions disclosed herein can aid in overcoming the aforementioned technical problems posed by existing framing systems noted above. Some of the embodiments disclosed herein can provide a framing system for mounting solar laminates to form a solar panel adapted to be mounted on a support surface of a structure, such as a roof of a building.

In some embodiments, a framing system for mounting solar collection devices on a support surface of a building structure, can comprise a plurality of interconnected frame members, each of said frame members comprising a unitary body having at least one longitudinal frame element and at least one crosswise frame element extending centrally from the longitudinal frame element. A plurality of connectors can connect the frame members to form one or more rows for supporting an array of solar collection devices. A plurality of mounts can be provided at an upper portion of the frame members, wherein the mounts are adapted to secure solar collection devices at a position spaced from said frame members.

In another embodiment, a framing system for mounting solar collection devices on a support surface of a building structure can comprise a plurality of interconnected frame members, each of said frame members being formed by a unitary body having a pair of upper and lower longitudinal frame elements and a crosswise frame element extending substantially centrally between said longitudinal frame members. A connector can be provided on the longitudinal frame elements configured to interconnect the frame members and form at least one row of an array of solar collector devices. At least one mount can be provided at an upper portion of the frame members configured to secure the solar collection devices at positions spaced from the frame members.

In yet another embodiment, a frame adapted to support a solar collection device can comprise a frame member formed by a unitary body having a longitudinal frame element, a crosswise frame element extending substantially centrally therefrom and a yoke adjoining the longitudinal and crosswise frame elements. At least a pair of spacer elements can be provided on a top-most portion of the longitudinal frame element to support at least one solar collection device on the frame member at a position spaced from the frame member. Additionally, a first connector plate can extend from one end portion of the longitudinal frame element to connect the frame member to another adjacent frame member and a second connector plate can extend from the free end portion of the crosswise frame element.

These and other objects and advantages of the present invention will become more apparent upon a reading of the ensuing detailed description taken in conjunction with the appended drawings.

DETAILED DESCRIPTION

Figure 1:
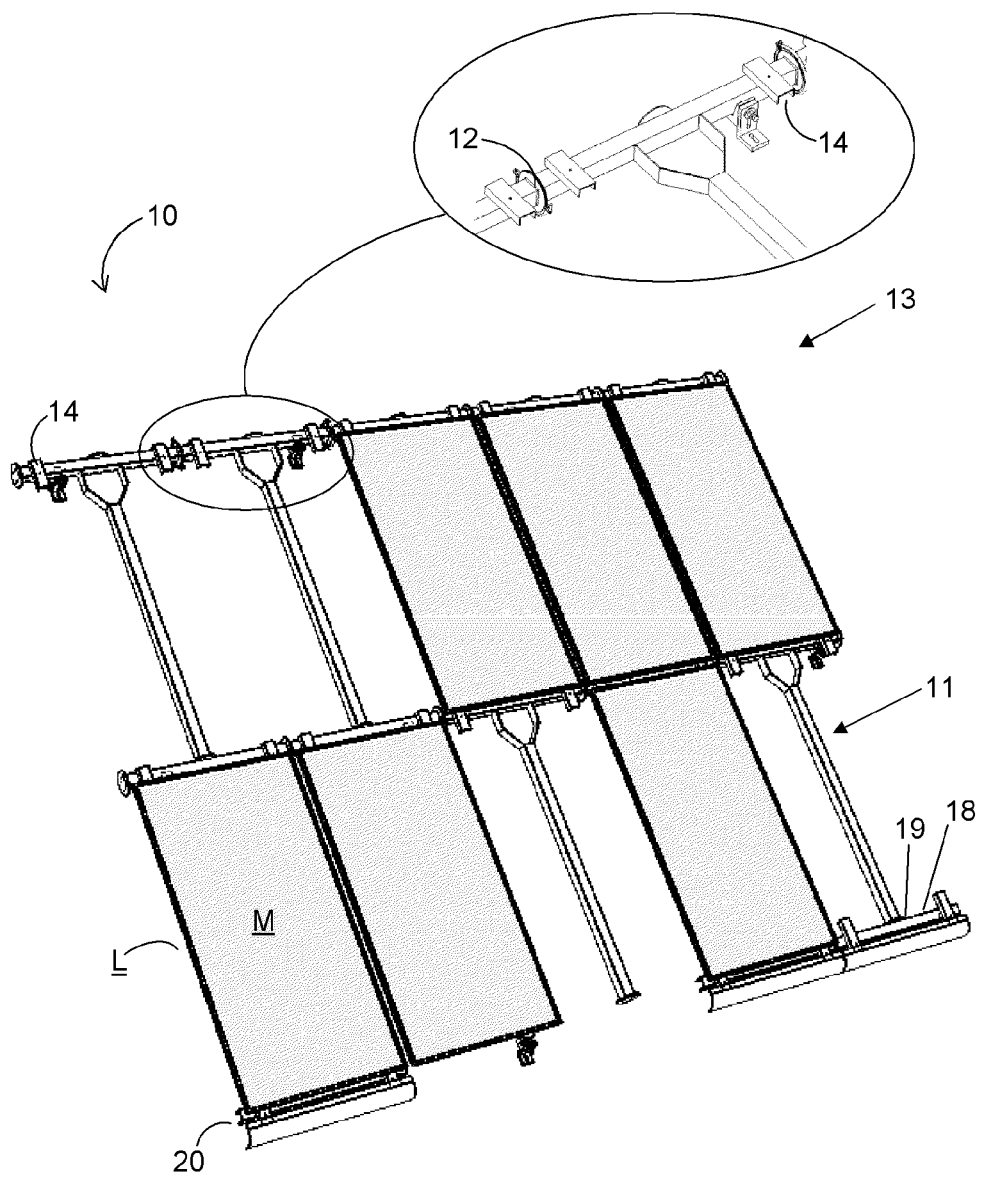
FIG. 1 is perspective view of an embodiment of a mounting system for mounting solar collection devices on a support surface, including a plurality of a T-shaped frame members.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature.

"Adjust"—Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are often described in the context of photovoltaic arrays and modules. However, these inventions can be used in other contexts as well, such as concentrated PV systems, thermal solar systems, etc.

Referring now to the different views of the drawings, a framing system 10 for mounting solar collection devices such as photovoltaic laminates L and/or photovoltaic modules M on a support surface, such as the roof of a building (10, 110). Each of the embodiments disclosed herein include a plurality of interconnected frame members 11.

A typical PV module includes a PV laminate or panel having an assembly of crystalline or amorphous semiconductor devices ("PV cells") electrically interconnected and encapsulated within a weather-proof barrier. One or more electrical conductors are housed inside the PV laminate through which the solar-generated current is conducted. A frame can connected to the periphery of the laminate L to form a PV module M.

A connector 12 can be configured to interconnect the frame members 11 and thereby form rows of the support array 13 for the solar laminates L. One or more solar collector mounts 14 can be provided at the upper portion of the frame members 11 to secure the solar laminates L or modules "M" at a position spaced above the support structure 10 and optionally, above the frame members 11.

Figure 2:
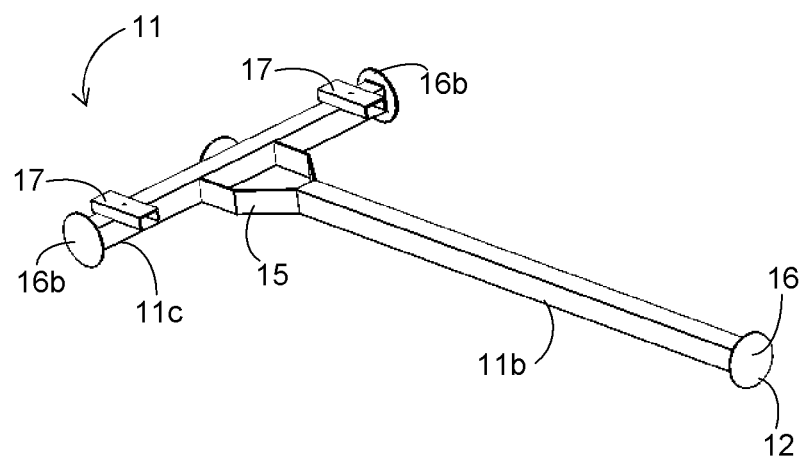
FIG. 2 is an enlarged perspective view of one of the T-shaped frame members of FIG. 1.
Figure 4:
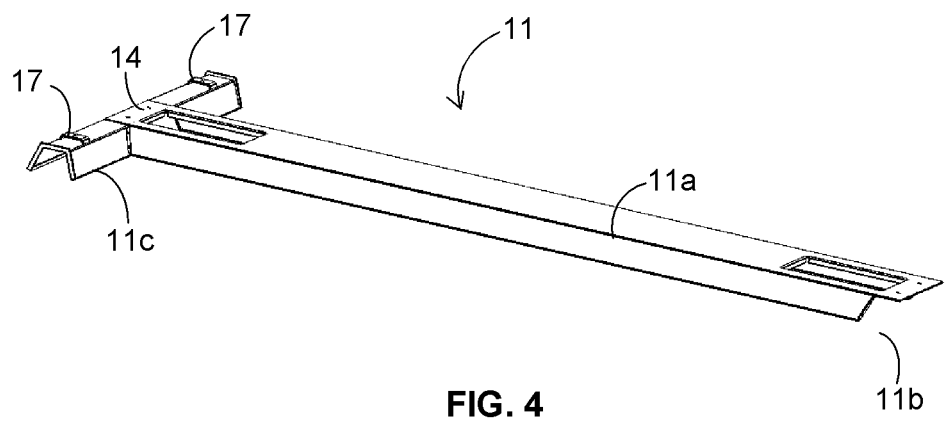
FIG. 4 is an alternative embodiment of the T-shaped embodiment of FIG. 2.

With reference to FIGS. 2 and 4, each frame member 11 can include a unitary body 11a having an interconnected longitudinal frame element 11b and a crosswise frame element 11c extending centrally from the longitudinal frame element 11b thereby defining a frame member having a generally "T-shaped configuration."

The longitudinal frame element 11b and the crosswise frame element 11c of the frame member 11 can be formed from channel structural metals. In the illustrated embodiment, the structural channel members face downwardly which thereby prevents water and debris from collecting in the frame elements 11a 11b. Other shapes, materials, and orientations can also be used.

The frame member 11 can include a yoke 15 adjoining the longitudinal frame element 11b and crosswise frame element 11c. Optionally, the yoke 15 can include a channeled section adjoining the longitudinal frame element 11b and crosswise frame element 11c. In some embodiments, the channeled section can further simplify the installation of electrical components and the wiring system of the solar module "M" (i.e. the electrical cables are allowed to pass on the channeled section), and also assists in maintaining the stability of the frame system 10.

In some embodiments of the frame member 11, the crosswise frame element 11c can be directly secured to the longitudinal frame element 11b as illustrated in FIG. 4 of the drawings. The yoke 15 can be secured to a lateral portion of the channeled longitudinal frame element 11b and a free end portion of the crosswise frame element 11c by, for example, welding the corresponding end portions of the frame elements and the yoke 15. Other manufacturing techniques can also be used.

With continued reference to FIGS. 1 and 2, the connector 12 can include connector plates 16, 16a, 16b extending from the longitudinal frame elements 11b and the crosswise frame element 11c. For example, the connector 12 can include a first connector plate 16a extending from at least one free end 11b of a lateral portion of the longitudinal frame element 11b. The plate 16a can be used to connect a frame member 11 contiguously to another frame member 11 forming a row of support array 13. The connector 12 can also include a second connector plate 16b extending from the free end 11c of the web formed on the crosswise frame element 11c opposite the yoke 15 to form an additional row of support array 13. The connector plates 16a, 16b of adjacent frame members 11 can be secured to each other to thereby interconnect the frame members 11 any connection technique, including but without limitation, welding, threaded fasteners such as bolts and nuts, screws or any other conventional fastening means. In some embodiments, the connector 12 can be in the form of an annular or toroidal ring, configured to capture the periphery of two abutting plates 16a, 16b. Such a ring can be formed in two halves, connected to each other with threaded fasteners. However, other configurations can also be used.

As further illustrated in FIG. 2, the longitudinal frame element 11b can be provided with the solar collector mounts 14. In some embodiments, the mounts 14 can include at least a pair of spaced apart spacer elements 17 provided on the top most portion of the longitudinal frame elements 11b. The elements 17 can be configured to support the solar laminates L or modules M on the frame members 11 at a raised position relative to the frame members 11. Fasteners such as bolts and nuts or other similar devices, can secure said solar laminates L and/or modules M onto the frame members 11. In some embodiments, the laminates L and modules can include fasteners fixed to a lower surface of thereof and configured to "snap fit" onto the spacer elements 18. For example, the spacer elements can include apertures and the laminates L and modules M can include studs (not shown) fixed to their lower surfaces, wherein the studs are configured to form an interference fit with the apertures. In some embodiments, the studs can have a bulged-shape, or a barbed portion such that the studs snap into engagement with the apertures. However, other configurations can also be used.

The spacer elements 17 can also be formed with a channeled section to facilitate wiring interconnecting the solar laminates L to an electrical system (not shown). The electrical system can include the array 13 as a power source connected to a remote connection device with power lines. The electrical system can also include a utility power source, a meter, an electrical panel with a main disconnect, a junction, electrical loads, and/or an inverter with the utility power source monitor. The electrical system can be configured and can operate in accordance with the descriptions set forth in U.S. Patent Publication No. 2010/0071744, the entire contents of which are hereby expressly incorporated by reference in its entirety for all purposes.

Referring again to FIG. 1, the framing system 10 can include additional auxiliary frame elements 18, optionally having channeled sections, and which can be adapted to be connected at the south portion of the frame members 11 forming the support array 13. The auxiliary frame elements 18 can include connector portions 19 adapted to fasten to the frame members 11 disposed at the south row of said support array 13.

The auxiliary frame 18 can also be provided with spacer elements 17 secured on the topmost portion of the web 18. The auxiliary elements 18 can also be provided with external connectors 20 adapted to be correspondingly fasten to the frame members 11 disposed at the south row of the support array 13. The external connectors 20 can include an elongated body having an attaching portion adapted to install auxiliary devices (not shown) to the solar module M. Examples of auxiliary devices that can be attached to the solar module M include wind deflector devices, squirrel guards and the like. Additional rows of arrays can be formed on the solar module M using the frame member 11 as herein described by installing additional auxiliary frame elements 18 along the south portion of the frame members 11.

Figure 3:
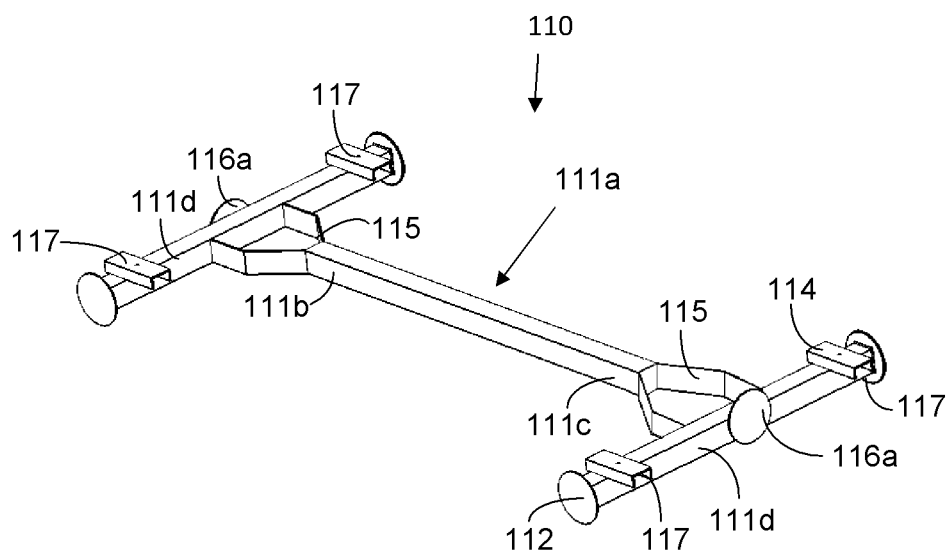
FIG. 3 is a perspective view of an I-shaped embodiment of the frame member 2.
Figure 5:
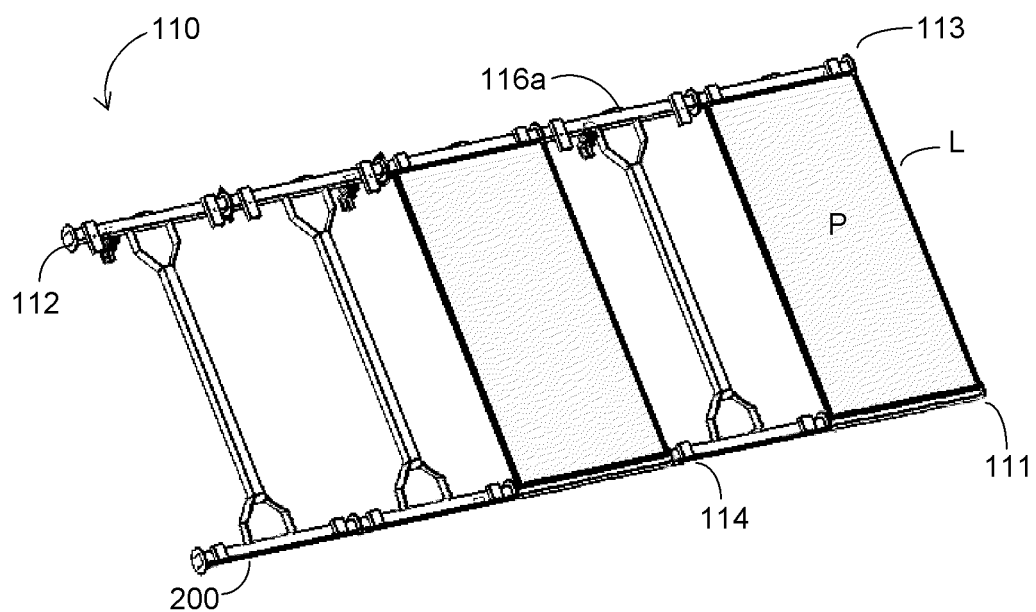
FIG. 5 is perspective view showing another embodiment of the framing system.

FIGS. 3 and 5 illustrate another embodiment of the framing system 10, identified by the reference numeral 110. The framing system 110, as is the framing system 10, configured to mount solar laminates L and/or solar modules M on a support surface, such as the roof of a building. The framing system 110 can comprise of a plurality of interconnected frame members 111a. Connectors 112 can be used to interconnect the frame members 111 so as to form rows of an array 113 of the solar modules M. Mounts 114 can be provided at the upper portion of the frame members 111 to secure the solar laminates L or modules M at a distance above the frame members 111.

Each frame member 111a can include interconnected upper longitudinal frame element 111b, a lower longitudinal frame element 111c, and a crosswise frame element 111d extending substantially and centrally between the upper and lower longitudinal frame elements 111b and 111c thereby defining a frame member having a generally "I-shaped" configuration.

The longitudinal frame elements 111b and 111c and the crosswise frame element 111d of the frame member 111a can be formed with metal structural channel members, although other materials and shapes can also be used. The frame member 111a can also include yokes 115. The yokes 115 can also have a channeled section and adjoining the longitudinal frame elements 111b and 111c with the crosswise frame element 111d. The channeled section formed on the yokes 115 and the adjoining the longitudinal frame elements 111b, 111c and crosswise frame element 111d can help simplify ease in installing the electrical components and the wiring system of the solar module M (i.e. the electrical cables are allowed to pass on the channeled section), and also assists in maintaining the stability of the frame system 110.

In some embodiments of the frame member 111a, the crosswise frame element 111d can be directly secured to the longitudinal frame elements 111b and 111c. The yokes 115 can be secured to a lateral portion of the channeled longitudinal frame element 111b and a free end portion of the crosswise frame element 111d by welding the corresponding end portions of the frame elements and the yokes 115. However, other fastening techniques can also be used.

The frame members 111a can also be provided with connectors 112 similar to the embodiments of FIGS. 2 and 4, which includes connector plates 116 extending from the longitudinal frame elements 111b, 111c. For example, as illustrated in FIG. 5, the connectors 12 can include a first connector plate 116a extending from at least one free end of the lateral portions of the longitudinal frame elements 111b, 111c to connect a frame member 111 contiguously to another frame member 111 forming a row of support array 113. The connector plates 116a can be secured correspondingly with each other to interconnect the frame members 111 by welding, bolts, screws, or any other conventional fastening means.

As further illustrated in FIGS. 3 and 5, the longitudinal frame elements 111b, 111c can be provided with a mounting arrangement 114. The mounting arrangement can include one or more spaced apart spacers 117. The spacers 117 can be secured to the topmost portion of the webs 111b, 111c of the longitudinal frame elements 111b, 111c to support the solar laminates L and or modules M on the frame members 111d. The spacer elements 117 can be formed with a channeled section to facilitate the passage of the wiring system interconnecting the solar laminate L and/or modules M to an electrical system (not shown). Fasteners such as bolts and the like can be used to secure said solar laminates L or modules M unto the frame members 111a.

Referring to FIG. 5, the framing system 110 can also include external connectors 200 provided on the lower longitudinal frame element 111c which is disposed on the south portion of the support array 113. The external connectors 200 include an elongated body having an attaching portion adapted to install auxiliary devices (not shown) to the solar module M. Examples of such auxiliary devices that can be attached to the solar module M are wind deflector devices, squirrel guards or the like.

Figure 6A:
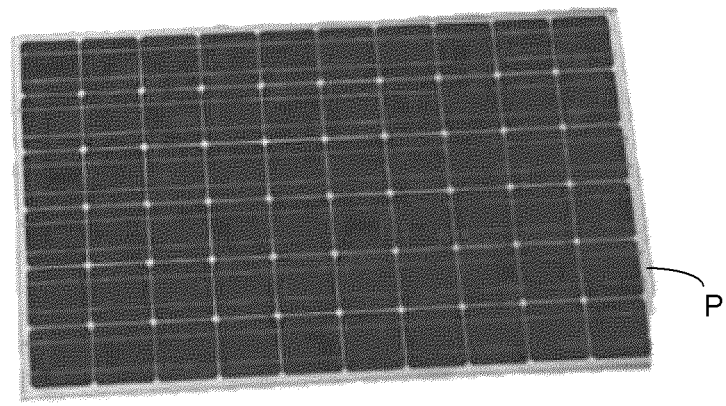
FIGS. 6a and 6b show examples of the solar laminates that can be mounted with any of the embodiments of FIGS. 1-5.
Figure 6B:
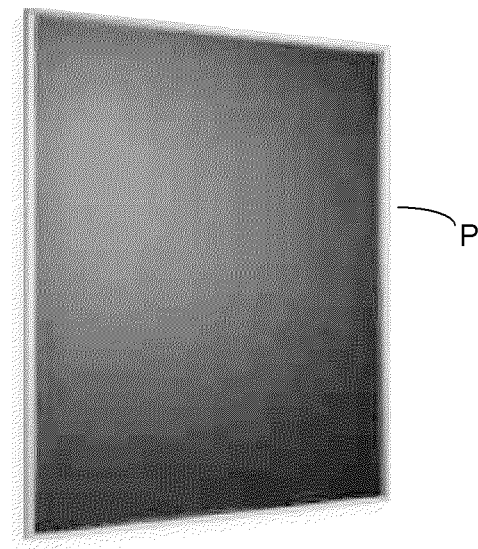

A method of installing the solar laminates L and/or modules M can begin with interconnecting the frame members 11, 111 with the connector plates, 16a, 16b, 116a provided on the longitudinal and crosswise frame elements and form the solar module M. Examples of solar modules M are shown in FIGS. 6a and 6b. The electrical components and wiring of the solar modules can be first installed in the support array before the solar modules M are fastened to the frame members 11, 111a.

After the installation of the wiring system, a solar module M or a "domino" or "halo" laminate can be installed and secured on the spacer elements 17, 117 provided on the frame members 11, 111a.

Figure 7A:
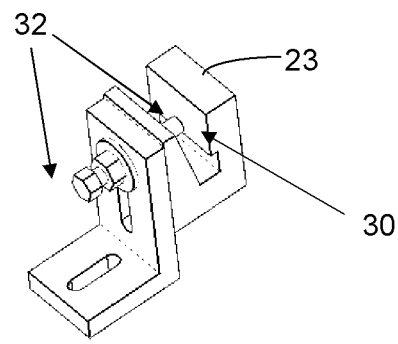
FIGS. 7a and 7b are perspective views showing an anchor device that can be used to secure the any of the frame members of FIGS. 1-5 to a support surface, such as a roof of a building.
Figure 7B:
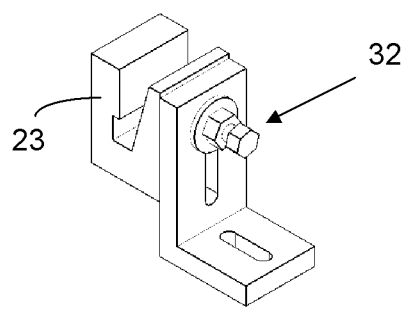

The frame members 11, 111a can be secured to the support surface with any type of known appropriate anchor, such as "roof anchors" which are well known in the solar industry. FIGS. 7a and 7b illustrate an optional anchor 23 that can be used. The anchor 23 can also be used to secure the external connectors 20, 200 to the frame members of the solar module M.

The anchor 23 includes an upwardly opening mouth portion 30 and a clamping device 32. As noted above, the frame members 11, 111a can be formed with one or more metal structural channel members, facing downwardly. Thus, a lower free edge of any of the various parts of the frame members 11, 111a can be positioned into the mouth portion 30 of the anchor 23 and secured in place with the clamping device. A further detailed disclosure of the anchor 23 as well as alternative embodiments of the anchor 23, are disclosed in FIGS. 4A and 4B and the accompanying text in U.S. patent application Ser. No. 13/532,712, the entire contents of which is hereby incorporated by reference.

Additional advantages and modifications of the present invention will readily occur to those skilled in the art in view of these teachings. The present invention in its broader aspects is not limited to the specific details, representative contrivances, and illustrative examples shown and described herein. Accordingly, various modifications may be made without departing from the spirit and scope of the general concept as defined in the appended claims and their equivalents.

What is claimed is:

1. A framing system for mounting solar collection devices on a support surface of a building structure, the framing system comprising:
   a plurality of interconnected frame members, each of said frame members comprising a unitary body having at least one longitudinal frame element extending along a first axis and at least one crosswise frame element extending centrally from and generally perpendicular to the longitudinal frame element along a second axis, wherein the at least one longitudinal frame element and the at least one crosswise frame element lie in a plane, the at least one crosswise frame element having opposing free ends comprising a first free end portion and a second free end portion spaced along the second axis, the at least one longitudinal frame element disposed between the opposing free ends;
   a plurality of connectors connecting the frame members to form one or more rows for supporting an array of solar collection devices, wherein each frame member of the plurality of interconnected frame members comprises a first connector on a first side of the at least one longitudinal element and a second connector on a second side of the at least one longitudinal element, the second side opposite the first side, the first connector extending from the first free end portion along the second axis and the second connector extending from the second free end portion along the second axis; and
   a plurality of mounts provided at an upper portion of the frame members, wherein the mounts are adapted to secure solar collection devices at a position spaced from said frame members.

2. The framing system of claim 1, wherein the frame members comprise a yoke adjoining the longitudinal and crosswise frame elements.

3. The framing system of claim 2 further comprising an additional auxiliary longitudinal frame element connected at the south portion of said frame members.

4. The framing system of claim 3 further comprising external connectors adapted to be correspondingly fastened to the frame members disposed at a southern-most row of the array.

5. The framing system of claim 1, wherein the mounts comprise at least a pair of spaced apart spacer elements provided on a topmost portion of the crosswise frame elements to support the solar collection devices on said frame members, and fasteners configured to secure the solar collection devices onto the frame members.

6. The framing system of claim 1, wherein the connectors comprise connector plates extending from one end portion of the longitudinal frame elements.

7. The framing system of claim 1, wherein the frame members have a channel cross-section.

8. The framing system of claim 5, wherein the spacer elements have a channel cross-section.

9. The framing system of claim 4, wherein the external connectors comprise an elongated body having an attaching portion adapted to install auxiliary devices to the solar array.

10. A framing system for mounting solar collection devices on a support surface of a building structure, the frame system comprising:
    a plurality of interconnected frame members, each of said frame members being formed by a unitary body having a pair of upper and lower crosswise frame elements and a longitudinal frame element extending substantially centrally between respective central portions of said crosswise frame elements, the longitudinal frame element generally perpendicular to said crosswise frame elements along a first axis, each of said crosswise frame elements extending parallel to a second axis, each of said crosswise frame elements having opposing free ends comprising a first free end portion and a second free end portion spaced along the second axis, the central portion of each crosswise frame element disposed between the opposing free ends;
    a first connector provided on and extending parallel to the second axis from the first free end portion of each of the crosswise frame elements;
    a second connector provided on and extending parallel to the second axis from the second free end portion of each of the crosswise frame elements, each of the first and second connectors configured to interconnect the frame members and form at least one row of an array of solar collector devices, the first and second connectors inhibiting relative rotation between neighboring frame members; and
    at least one mount provided at an upper portion of the frame members configured to secure the solar collection devices at positions spaced from the frame members.

11. The framing system of claim 10, wherein the frame members comprise corresponding yokes adjoining the longitudinal and crosswise frame elements.

12. The framing system of claim 10 further comprising external connectors adapted to be correspondingly fastened to the frame members disposed at a southern-most row of the array.

13. The framing system of claim 12, wherein the at least one mount comprises at least a pair of spaced apart spacer elements provided on a top-most portion of the upper and lower crosswise frame elements configured to support the solar collection devices on the frame members, and a plurality of fasteners configured to secure the solar collection devices onto the interconnected frame members.

14. The framing system of claim 10, further comprising a connector extending outwardly from the central portion of the crosswise frame elements along the first axis.

15. The framing system of claim 10, wherein the frame members comprise a channel cross-section.

16. The framing system of claim 13, wherein the spacer elements comprise a channel cross-section.

17. The framing system of claim 12, wherein the external connectors comprise an elongated body having an attaching portion adapted to install auxiliary devices to the array.

18. The framing system of claim 1, wherein the first free end portion of a first crosswise frame element of a first frame member is connected to the second free end portion of a second crosswise frame element of a second frame member, the first frame member adjacent the second frame member.

19. The framing system of claim 10, wherein the first free end portion of a first crosswise frame element of a first frame member is connected to the second free end portion of a second crosswise frame element of a second frame member, the first frame member adjacent the second frame member.

20. The framing system of claim 1, further comprising a solar collection device mounted on a first frame member of the plurality of interconnected frame members, the first frame member sized and shaped to support a single solar collection device.

21. The framing system of claim 1, wherein an uppermost extent of the at least one longitudinal frame element does not extend above an uppermost extent of the at least one crosswise frame element.

22. The framing system of claim 10, wherein a height of the longitudinal frame element is the same as a height of each of the crosswise frame elements.

* * * * *